UNITED STATES PATENT OFFICE.

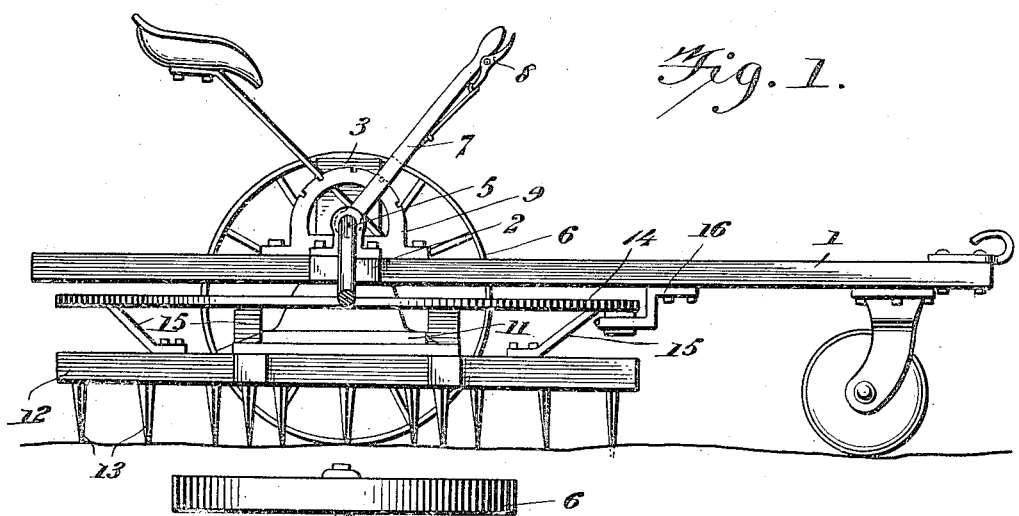
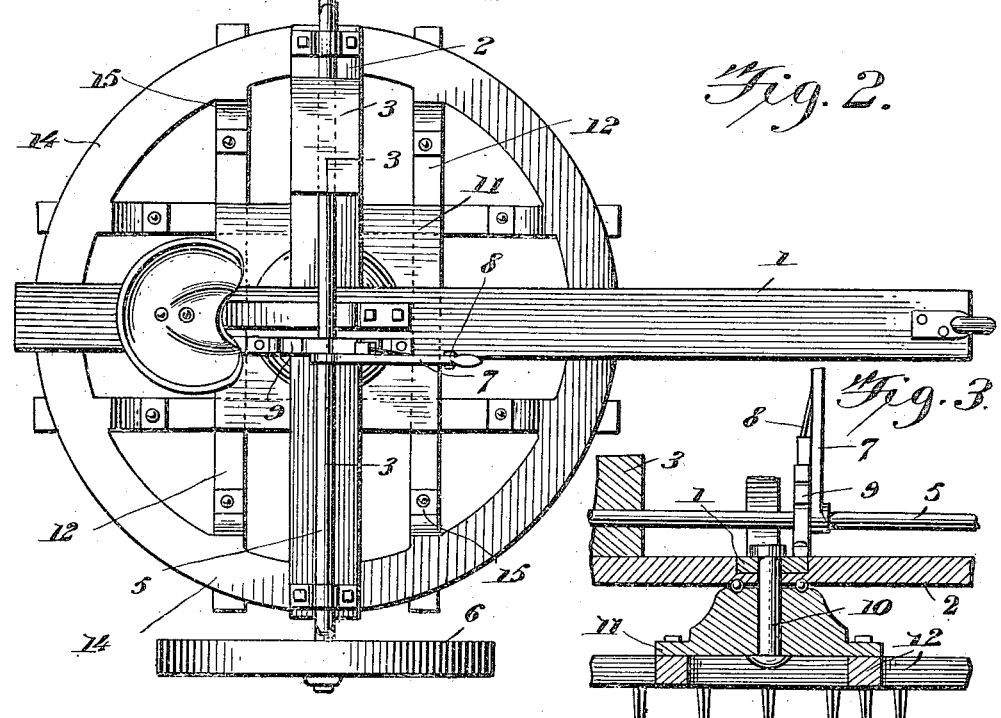
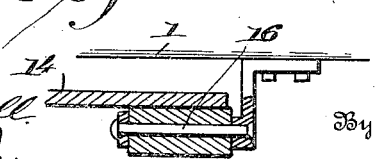

SAMUEL JAMES McCALL, OF BUTLER, PENNSYLVANIA.

HARROW.

1,137,644.   Specification of Letters Patent.   Patented Apr. 27, 1915.

Application filed July 22, 1913. Serial No. 780,532.

*To all whom it may concern:*

Be it known that I, SAMUEL J. MCCALL, a citizen of the United States, residing at Butler, in the county of Butler and State of Pennsylvania, have invented new and useful Improvements in Harrows, of which the following is a specification.

This invention has relation to harrows and it consists in the novel features hereinafter described and claimed.

An object of the invention is to provide a harrow of the rotary type having means for raising and lowering the rotating member in order that the same may be elevated above the soil or caused to operate at any desired depth in the soil.

With the above objects in view the harrow comprises a frame upon which is journaled a crank axle. Supporting wheels are journaled upon the ends of the said axle and means are provided for turning the axle and securing the same in an adjusted position. A caster wheel is also attached to the frame. A harrow member is journaled for rotation below the frame and the frame is provided at one side with a weight whereby the soil engaging elements of the harrow member at one side thereof enter deeper into the soil than at the opposite side. Consequently the harrow member is rotated as the harrow is passed over the soil.

In the accompanying drawing:—Figure 1 is a side elevation of the harrow. Fig. 2 is a top plan view of the same. Fig. 3 is a partial sectional view of the same cut on the line 3—3 of Fig. 2. Fig. 4 is a detailed sectional view of a portion of a ring and adjacent parts used upon the harrow.

The frame of the harrow comprises a bar 1 to which is attached a cross-bar 2. A weight 3 bears upon the end of the cross bar 2 at one side of the bar 1. A caster wheel is attached to the under side of the forward portion of the bar 1.

A crank axle 5 is journaled upon the cross bar 2 and ground wheels 6 are journaled for rotation at the ends of the axle 5. The axle 5 passes through the weight 3. A lever 7 is fixed to the intermediate portion of the axle 5 and carries a spring pressed pawl 8 which is adapted to be engaged with the teeth of segment 9 mounted upon the bar 1. Therefore it will be seen that by swinging the lever 7 the axle 5 may be partially rotated whereby the ground wheels 6 will be projected more or less below the frame of which the bars 1 and 2 are components and thus means are provided for positioning the said bars at a desired distance above the surface of the soil. A shaft 10 is carried by the bars 1 and 2 at the point where the said bars intersect each other and the said shaft carries at its lower end a block 11.

Bars 12 are connected with the edges of the block 11 and carry harrow teeth 13.

A ring 14 is provided with lugs 15 which are secured to the upper surfaces of the bars 12 and the said ring is disposed between the bars 12 and the bars 1 and 2.

A guide member 16 is carried by the bar 1 and projects under the forward portion of the ring 14.

The bar 1 may be provided at its forward end with any suitable form of clevis or other means for attaching the harrow to draft animals. Inasmuch as the weight 3 positions the center of gravity of the harrow structure to one side of the bar 1 as the harrow is moved over the soil and the teeth 13 are in engagement with the same the teeth at one side of the bar will be deeper in the soil than the teeth at the opposite side and consequently the said teeth and the bars 12 rotate about the axis of the shaft 10. This rotary movement on the part of the teeth effectually pulverizes the soil and breaks up the clods. This operation takes place when the wheels 6 are raised and the teeth 13 support the harrow.

Having described the invention what is claimed is:—

A harrow comprising a frame, a harrow member journaled at its center to the frame for rotation with relation to the same, a weight mounted upon the frame at one side of the center of the harrow member, a crank axle journaled upon the frame and passing through the weight and turnably mounted therein, and wheels journaled upon the ends of the axle.

In testimony whereof I affix my signature in presence of two witnesses.

SAMUEL JAMES McCALL.

Witnesses:
HARRY SMITH,
DAN EMRICK.

Copies of this patent may be obtained for five cents each, by addressing the "Commissioner of Patents, Washington, D. C."